Patented Apr. 28, 1953

2,636,881

UNITED STATES PATENT OFFICE 2,636,881

3-SUBSTITUTED, 3-ARYL, 2-PIPECOLINES AND SALTS THEREOF

Everett M. Schultz, Glenolden, Pa., assignor to Sharp & Dohme, Incorporated, Philadelphia, Pa., a corporation of Maryland No Drawing. Application January 6, 1951, Serial No. 204,829

5 Claims. (Cl. 260—293)

This application is broadly concerned with new chemical compounds. It is more particularly concerned with 2-methyl-3,3-disubstituted piperidines, the N-methyl compounds derived therefrom and also the quaternary compounds derived therefrom. The piperidines can be represented conveniently by the general formula:

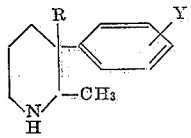

in which R is (1) alkyl up to and including lauryl and preferably lower alkyl up to 8 carbon atoms, (2) mononuclear aralkyl, preferably benzyl and (3) mononuclear aryl, that is $C_6H_4Y$, and in which Y is chosen from the group consisting of hydrogen, lower alkyl, halogen and alkoxy.

The 2-methyl-3,3-disubstituted piperidines of this invention are conveniently obtained by hydrogenation of the 2,3,3-substituted-3,4,5,6-tetrahydropyridines described in my co-pending application, Serial No. 179,896 entitled "Compounds obtained from substituted-δ-oxocapronitriles and methods." The tetrahydropyridine is dissolved in a suitable solvent, such as for example, absolute ethanol, and hydrogenated in the presence of Adam's platinum catalyst at room temperature and atmospheric pressure or greater. The piperidine is recovered from the reaction mixture by separating the catalyst by filtration, removing the solvent by distillation under diminished pressure and purifying the residual piperidine by vacuum distillation.

Having obtained the piperidine one can obtain the N-methylpiperidine by reacting the piperidine with formic acid and formaldehyde according to known methylation procedures. Further, starting with the N-methylpiperidine, one obtains various quaternary salts by reacting the N-methylpiperidine with an alkyl halide. The usual quaternizing agents are utilizable, for example, methyl iodide, benzyl chloride, allyl bromide, dimethylsulfate and the like. The known methods of quaternization are applicable.

The compounds of this invention including the piperidines, N-methylpiperidines, and the quaternary salts are useful in that they possess physiological activity. These compounds are contemplated by the present invention.

The invention is illustrated by, but not necessarily restricted to, the following preferred embodiments:

*Example 1—Preparation of 2-methyl-3-phenylpiperidine.*—46.8 grams (0.25 mole) γ-phenyl-δ-oxocapronitrile was dissolved in 100 ml. absolute ethanol. To this was added 3 grams Raney nickel catalyst, and the reaction mixture exposed to hydrogen in an autoclave at a pressure of approximately 100 atmospheres and a temperature of approximately 90–100° C. The autoclave was rocked during the hydrogenation in order to admix the reactants. The reaction was allowed to proceed until the uptake of hydrogen ceased. The reaction mixture was cooled and removed from the autoclave and the catalyst separated by filtration. The ethanol was evaporated and the residual oil dissolved in 150 ml. 10% hydrochloric acid. This acid solution was extracted twice with approximately an equal volume of ether. The water solution was then made basic with 20% sodium hydroxide solution and the product separated as an oil. The oil was taken up in approximately 200 ml. ether and the ether solution was dried over anhydrous potassium carbonate. The potassium carbonate was separated from the ether solution by filtration and the ether removed by evaporation. The residual oil was distilled under vacuum and there was obtained 2-methyl-3-phenylpiperidine; B. P. 75–9° C. at 0.5 mm. Hg; $n_D^{25}$ 1.5409. The product was obtained in 82% yield. The hydrochloride salt melts at 202–3° C.

*Example 2—Preparation of 2,3-dimethyl-3-phenylpiperidine.*—26.2 g. (0.14 mole) 2,3-dimethyl-3-phenyl-3,4,5,6-tetrahydropyridine was dissolved in 100 ml. absolute ethanol and to this solution was added 0.5 g. pre-reduced Adam's platinum catalyst suspended in 25 ml. absolute ethanol. This mixture was shaken under an atmosphere of hydrogen at room temperature and an initial pressure of approximately 35 lbs. per sq. inch pressure until the uptake of hydrogen ceased. The uptake of hydrogen stopped in approximately two hours. The reaction mixture was filtered to remove the catalyst and the ethanol evaporated. The oily residue was distilled under vacuum and there was obtained 25 grams (94.5%) of 2,3-dimethyl-3-phenylpiperidine; B. P. 80–86° at 0.5 mm. Hg; $n_D^{25}$ 1.5421. The hydrochloride salt melts at 246–7° C.

*Example 3—Preparation of 2-methyl-3-ethyl-3-phenylpiperidine.*—Following the procedure outlined in Example 2 but replacing the tetrahydropyridine there used by an equimolar quantity of 2-methyl-3-ethyl-3-phenyl-3,4,5,6-tetrahydropyridine there was obtained 2-methyl-3-ethyl-3-phenylpiperidine, B. P. 90–95° C. at 0.5 mm. Hg; $n_D^{25}$ 1.5402. It is to be noted that the compound obtained in this example is a mixture of two racemates.

*Example 4—Preparation of 2 - methyl - 3 - n - propyl-3-phenylpiperidine.*—Following the procedure outlined in Example 3 and substituting for the tetrahydropyridine there used an equimolar quantity of 2-methyl-3-n-propyl-3-phenyl-3,4,5,6-tetrahydropyridine there is obtained an 83% yield of 2-methyl-3-n-propyl-3-phenylpiperidine, B. P. 95–8° C. at 0.5 mm. Hg; $n_D^{25}$ 1.5348. As occurred in Example 3 above this compound is a mixture of two racemates. These α and β racemates were separated by fractional crystallization of the picrates.

To the mixture of the racemates was added an equimolar quantity of picric acid dissolved in 70% aqueous acetone. The mixture was heated almost to boiling until a clear solution resulted. The solution then was cooled to 50° C. and the crystals which had at that time deposited were removed by filtration. Then, the filtrate was cooled to 0° C. and a second crop of crystals harvested by filtration.

The first crop of crystals was the picrate of the α-racemate. Upon recrystallization from acetone there was obtained the pure picrate of the α-racemate, M. P. 206–8° C.

The second crop of crystals was repeated recrystallized from 75% aqueous acetone each time harvesting a small crop of crystals which appeared when the solution was cooled to 50° C. and discarding these crystals. Thereafter, the solution was cooled to 0° C. and a crop of crystals harvested which was used as starting material for further recrystallization. This process was repeated and there was obtained eventually the pure picrate of the β-racemate, M. P. 169–72° C.

The picrate of the α-racemate was decomposed by treatment with lithium hydroxide solution and the free base was extracted therefrom with ether. The ether solution was dried over potassium carbonate, the potassium carbonate removed, the ether evaporated, and the residual oil distilled under vacuum. There was obtained the pure α-racemate of 2-methyl-3-n-propyl-3-phenylpiperidine; B. P. 105–6° C. at 1.0 mm. Hg; $n_D^{25}$ 1.5363. The hydrochloride salt of the α-racemate melts at 243–4° C.

The picrate of the β-racemate was decomposed in a manner similar to that described above for the α-racemate. There was obtained the β-racemate of 2-methyl-3-n-propyl-3-phenylpiperidine; B. P. 100–102° C. at 0.5 mm. Hg; $n_D^{25}$ 1.5350. The hydrochloride salt of the β-racemate melts at 287–9° C. (dec.).

*Example 5—Preparation of 2-methyl-3,3-diphenylpiperidine.*—Following the procedure outlined in Example 2 and substituting for the tetrahydropyridine there used an equimolar quantity of 2-methyl-3,3-diphenyl-3,4,5,6-tetrahydropyridine there was obtained 2-methyl-3,3-diphenylpiperidine which was characterized as its hydrochloride salt; M. P. 294–6° C. (dec.). The N-benzoyl derivative melts at 205–6° C.

*Example 6—Preparation of 2-methyl-3-benzyl-3-phenylpiperidine.*—Following the procedure outlined in Example 2 and substituting for the tetrahydropyridine there used an equimolar quantity of 2-methyl-3-benzyl-3-phenyl-3,4,5,6-tetrahydropyridine there was obtained in 76% yield, 2-methyl-3-benzyl-3-phenyl-piperidine; B. P. 151–151.5° C. at 0.5 mm. Hg; $n_D^{25}$ 1.5855. Similar to the product described in Example 4, the product herein is a mixture of two racemic forms.

Further examples of the preparation of the piperidines of this invention will be apparent from a consideration that on following the procedure outlined in Example 2, and using an appropriately substituted tetrahydropyridine there was obtained 2-methyl-3-n-butyl-3-phenylpiperidine, 2,3-dimethyl-3-p-tolypiperidine, 2,3-dimethyl-3-p-bromophenylpiperidine, 2-methyl-3-n-propyl-3-p-chlorophenylpiperidine, 2-methyl-3-ethyl-3-p-isopropylphenylpiperidine, and 2-methyl - 3 - n - propyl - 3 - p - methoxyphenylpiperidine.

*Example 7—Preparation of 1,2-dimethyl-3-phenylpiperidine.*—25.5 g. (0.140 mole) 2-methyl-3-phenylpiperidine (obtained as in Example 1) was mixed with 30 g. of 90% formic acid (0.58 mole) and 23.5 g. 37% formaldehyde (0.29 mole). This mixture was heated on a steam bath for approximately 3 hours. 25 ml. concentrated hydrochloric acid was then added to the reaction mixture and the volume of the solution was reduced to approximately one-half by distillation under vacuum. The residue was made basic by the addition of 20% sodium hydroxide solution and the amine separated as an oil. The oil was taken up in approximately 150 ml. ether and the ether solution dried over potassium carbonate. The potassium carbonate was removed by filtration and the ether evaporated. The residual oil was distilled at reduced pressure yielding 24.4 g. (89%) of 1,2-dimethyl-3-phenylpiperidine; B. P. 71.5° C. at 0.5 mm. Hg; $n_D^{25}$ 1.5305. The hydrochloride salt melts at 219–20° C.

*Example 8—Preparation of 1,2,3-trimethyl-3-phenylpiperidine.*—Following the procedure outlined in Example 7 and substituting for the piperidine there used an equimolar quantity of 2,3-dimethyl-3-phenyl-piperidine (obtained as in Example 2) there was obtained a 77% yield of 1,2,3-trimethyl-3-phenylpiperidine; B. P. 83–5° C. at 0.5 mm. Hg; $n_D^{25}$ 1.5324. The hydrochloride salt melts at 231–3° C. (dec.).

*Example 9—Preparation of 1,2-dimethyl-3-ethyl-3-phenylpiperidine.*—Following the procedure outlined in Example 7 and substituting for the piperidine there used an equimolar quantity of 2-methyl - 3 - ethyl - 3 - phenylpiperidine (obtained as in Example 3) was obtained 1,2-dimethyl-3-ethyl-3-phenylpiperidine; B. P. 90–5° C. at 0.5 mm. Hg; $n_D^{25}$ 1.5310.

*Example 10—Preparation of 1,2-dimethyl-3-n-propyl-3-phenylpiperidine.*—Following the procedure outlined in Example 7 and substituting for the piperidine there used an equimolar quantity of 2-methyl-3-n-propyl-3-phenylpiperidine (obtained as in Example 4), there was obtained in 82.5% yield 1,2-dimethyl-3-n-propyl-3-phenylpiperidine; B. P. 101–5° C. at 0.5 mm. Hg; $n_D^{25}$ 1.5270.

*Example 11—Preparation of 1,2-dimethyl-3,3-diphenylpiperidine.*—Following the procedure outlined in Example 7 and substituting for the piperidine there used an equimolar quantity of 2-methyl-3,3-diphenylpiperidine (obtained as in Example 5) there was obtained 1,2-dimethyl-3,3-diphenylpiperidine, M. P. 91–92.5° C.

Further examples of the preparation of N-methyl piperidines embraced by this invention will be apparent from the fact that when 2-methyl-3-n-butyl-3-phenylpiperidine, 2-methyl-3-benzyl-3-phenylpiperidine, 2,3 - dimethyl-3-p-tolylpiperidine, 2,3 - dimethyl-3-p-bromophenylpiperidine, 2 - methyl - 3 - n - propyl-3-p-chlorophenylpiperidine, 2 - methyl - 3 - ethyl - 3-p-isopropylphenylpiperidine, 2 - methyl - 3 - p-chlorobenzyl-3-phenylpiperidine, and 2-methyl-3-n-propyl-3-p-methoxyphenylpiperidine (obtained by methods of preparation similar to that outlined in Example 2) were reacted according to the procedure outlined in Example 7, there was obtained respectively, 1,2-dimethyl-3-n-butyl-3-phenylpiperidine, 1,2-dimethyl-3-benzyl-3-phenylpiperidine, 1,2-dimethyl-3-p-tolyl-3-phenylpiperidine, 1,2,3-trimethyl-3-p-bromophenylpiperidine, 1,2-dimethyl-3-n-propyl-3-p-chlorophenylpiperidine, 1,2-dimethyl-3-ethyl-3-p-isopropylphenylpiperidine, 1,2-dimethyl-3-p-chlorobenzyl-3-phenylpiperidine, 1,2-dimethyl-3-n-propyl-3-p-methoxyphenylpiperidine.

*Example 12.—Preparation of 1,2-dimethyl-3-phenylpiperidine methiodide.*—5 g. (0.0265 mole) 1,2-dimethyl-3-phenylpiperidine (obtained as in Example 7) and 10 ml. methyl iodide (reagent grade) were mixed together with cooling. It is to be noted that this is a vigorous reaction and the methiodide should be added to the piperidine with caution. The reaction mixture solidified promptly. The solid product was triturated with ether and collected on a filter. The product was recrystallized twice from 70% aqueous methanol. There was obtained 1,2-dimethyl-3-phenylpiperidine methiodide, M. P. 266–8° C. (dec.).

*Example 13—Preparation of 1,2-dimethyl-3,3-diphenylpiperidine methiodide.*—5.0 gr. (0.0189 mole) of 1,2-dimethyl-3,3-diphenylpiperidine (obtained as in Example 11) was dissolved in 100 ml. of ethanol. To this was added 6 ml. methyl iodide and the mixture was maintained at reflux temperature for approximately 3 hrs. The solution was then evaporated to approximately two-thirds its original volume and cooled. Then 50 ml. ether was added whereupon a crystalline precipitate was formed. This crystalline product was separated by filtration and recrystallized once from water and once from methanol. There was obtained 1,2-dimethyl-3,3-diphenylpiperidine methiodide, M. P. 236–238° C. (dec.).

Additional examples of the quaternary compounds of this invention will be apparent from considering that, following the procedure outlined above, on the reaction of 1,2,3-trimethyl-3-phenylpiperidine with dimethyl sulfate there was obtained 1,2,3-trimethyl-3-phenylpiperidine methosulfate, from 1,2-dimethyl-3-ethyl-3-phenylpiperidine and benzyl chloride there was obtained methyl benzyl-(2-methyl-3-ethyl-3-phenylpiperidinium) chloride, from 1,2-dimethyl-3-n-propyl-3-phenylpiperidine and allyl-bromide there was obtained methyl allyl-(2-methyl-2-n-propyl-3-phenylpiperidinium) bromide, from 1,2-dimethyl-3-n-butyl-3-phenylpiperidine and benzyl bromide there was obtained methyl benzyl-(2-methyl-3-n-butyl-3-phenylpiperidinium) bromide. Further, on the reaction of 1,2-dimethyl-3-p-tolyl-3-phenylpiperidine, 1,2,3-trimethyl-3-p-bromophenylpiperidine, 1,2-dimethyl-3-n-propyl-3-p-chlorophenylpiperidine, 1,2-dimethyl-3-ethyl-3-p-isopropylphenylpiperidine, 1,2-dimethyl-3-p-chlorobenzyl-3-phenylpiperidine, 1,2-dimethyl-3-n-propyl-3-p-methoxyphenylpiperidine with methyl iodide there was obtained respectively, 1,2-dimethyl-3-p-tolyl-3-phenylpiperidine methiodide, 1,2,3-trimethyl-3-p-bromophenylpiperidine methiodide, 1,2-dimethyl-3-n-propyl-3-p-chlorophenylpiperidine methiodide, 1,2-dimethyl-3-ethyl-3-p-isopropylphenylpiperidine methiodide, 1,2-dimethyl-3-p-chlorobenzyl-3-phenylpiperidine methiodide, 1,2-dimethyl-3-n-propyl-3-p-methoxyphenylpiperidine methiodide.

What is claimed is:

1. A compound selected from the group consisting of

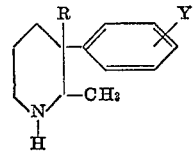

and its acid addition salts, in which R is chosen from the group consisting of alkyl having from 1 to 12 carbon atoms, benzyl, phenyl, lower-alkyl phenyl, mono-chloro-, -bromo- and -iodo-phenyl, and lower alkoxy phenyl radicals; and Y is chosen from the group consisting of hydrogen, lower alkyl, chloride, bromide, iodide and lower alkoxy radicals.

2. 2,3-dimethyl-3-phenylpiperidine.
3. 2-methyl-3-ethyl-3-phenylpiperidine.
4. 2-methyl-3-benzyl-3-phenylpiperidine.
5. 2-methyl-3,3-diphenylpiperidine.

EVERETT M. SCHULTZ.

References Cited in the file of this patent

UNITED STATES PATENTS

| Number | Name | Date |
|---|---|---|
| 2,524,643 | Walter et al. | Oct. 3, 1950 |

OTHER REFERENCES

Walters et al., J. Am. Chem. Soc., vol 55, pp. 4625–4629, (1933).

Koelsch, J. Am. Chem. Soc., vol. 65, pp. 2093–2095, (1943).

Fellows, Chem. Abst., vol. 39, p. 983, (1945).